R. C. PENFIELD.
METHOD OF HANDLING BRICKS.
APPLICATION FILED MAR. 5, 1910.
1,051,001.
Patented Jan. 21, 1913.
4 SHEETS—SHEET 1.
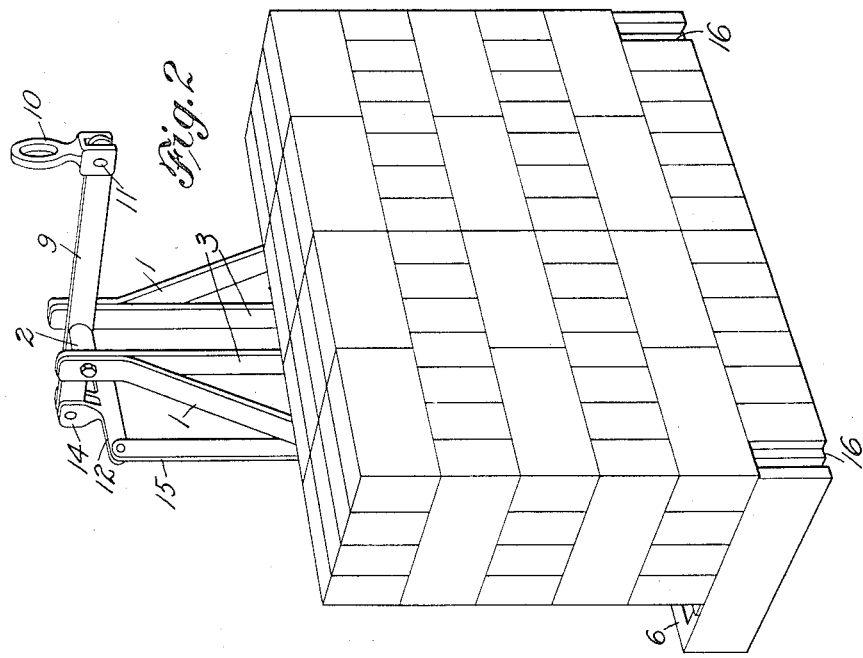
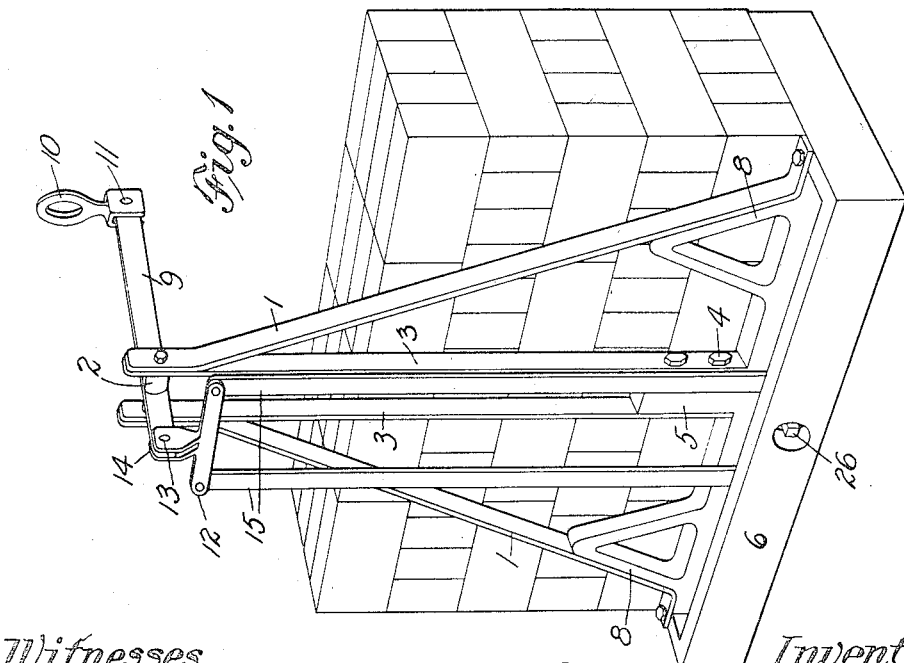

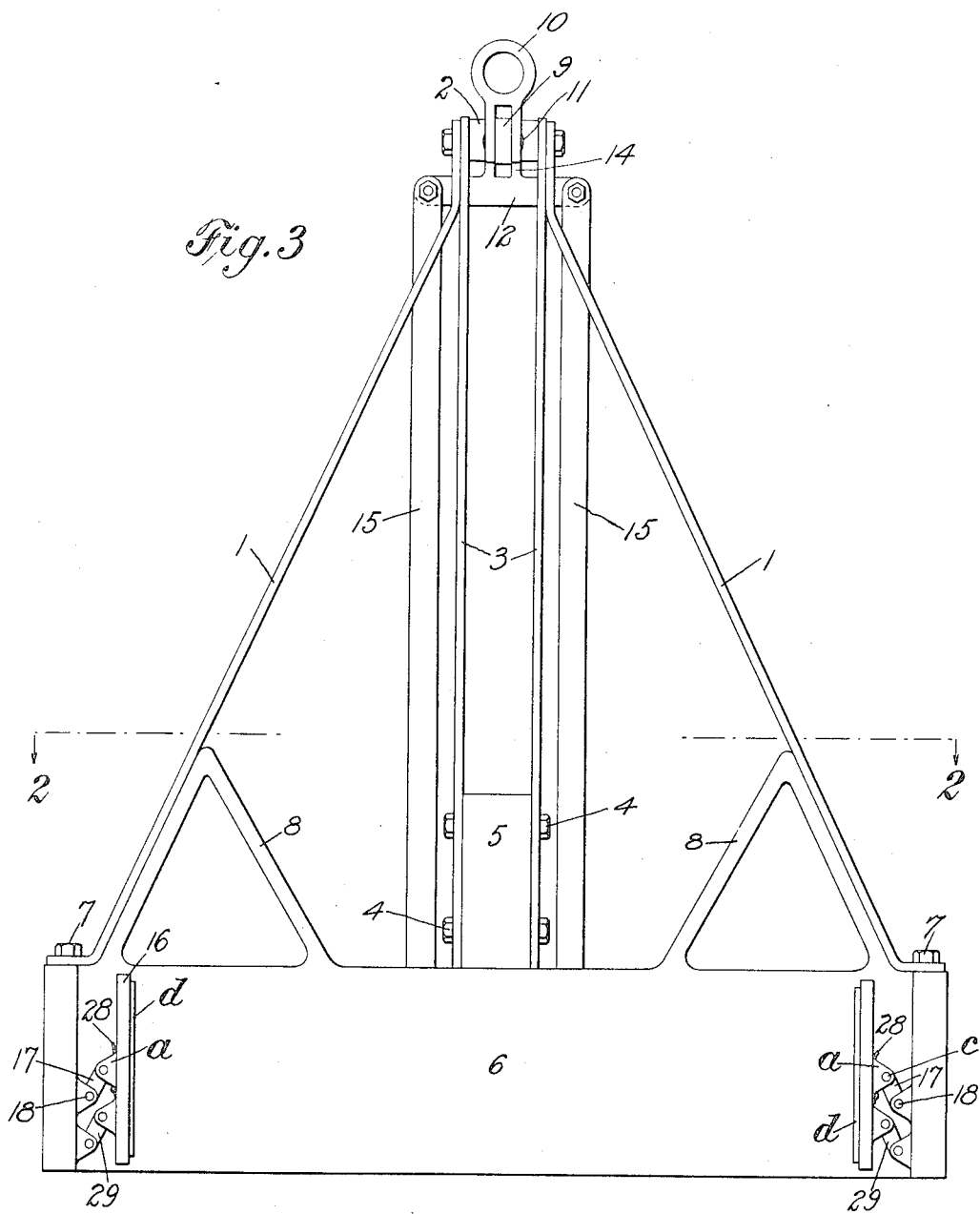

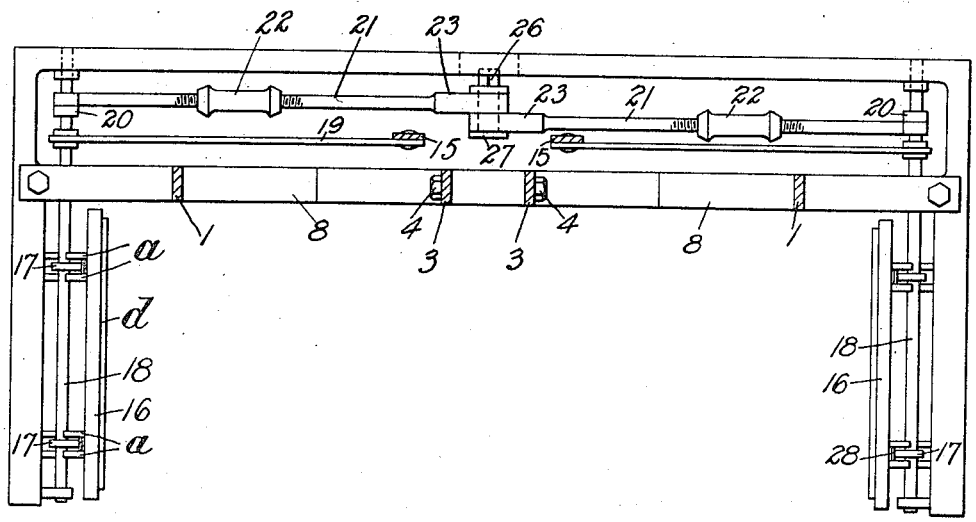
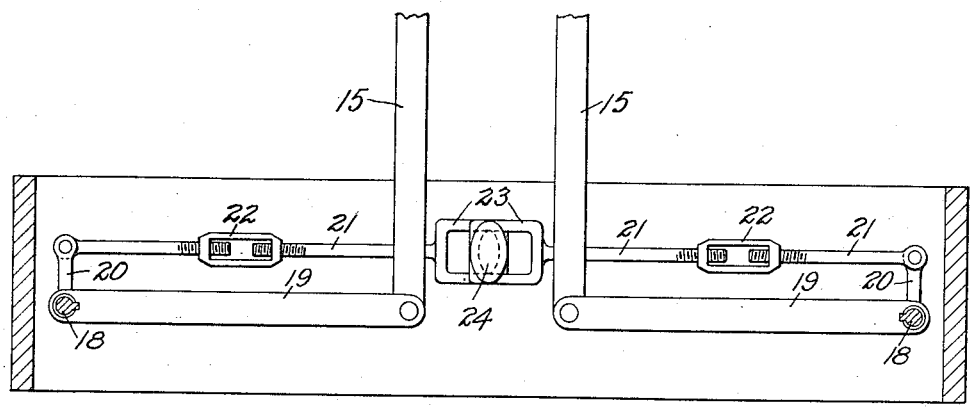

R. C. PENFIELD.
METHOD OF HANDLING BRICKS.
APPLICATION FILED MAR. 5, 1910.
1,051,001.
Patented Jan. 21, 1913.
4 SHEETS—SHEET 4.
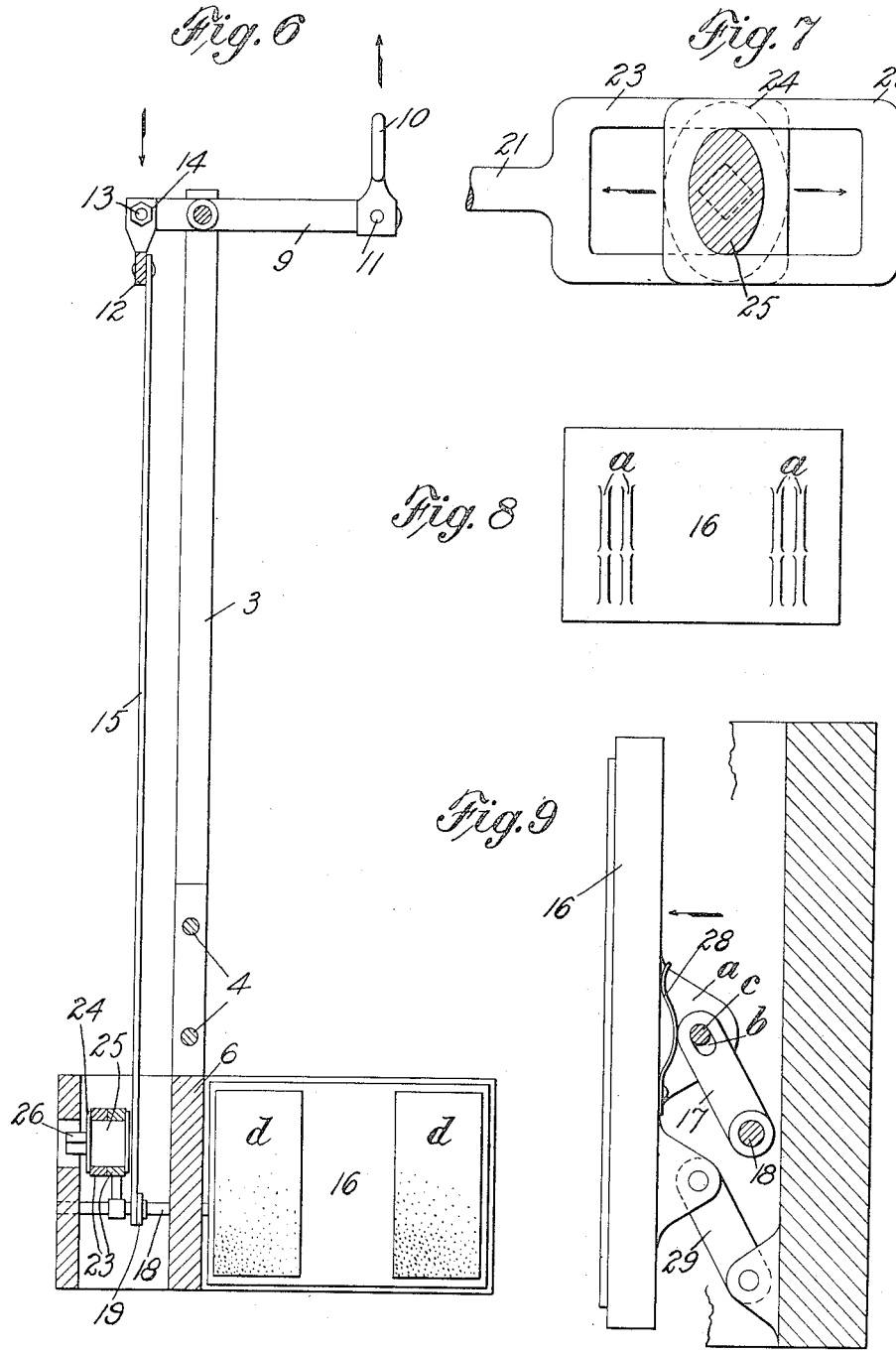

UNITED STATES PATENT OFFICE.

RAYMOND C. PENFIELD, OF NEW YORK, N. Y.

METHOD OF HANDLING BRICKS.

1,051,001.     Specification of Letters Patent.     Patented Jan. 21, 1913.

Original application filed October 8, 1908, Serial No. 456,692. Divided and this application filed March 5, 1910. Serial No. 547,420.

*To all whom it may concern:*

Be it known that I, RAYMOND C. PENFIELD, a citizen of the United States of America, residing at New York city, in the county of New York and State of New York, have invented certain new and useful Improvements in Methods of Handling Bricks, of which the following is a specification, reference being had therein to the accompanying drawing.

This invention relates to a method of handling bricks.

A primary object is to avoid the repeated rehandling of burned or finished brick by providing mechanism which can lay hold of and transport the brick in stack formation from point to point.

As to the method therein involved, the invention consists in stacking or piling up masses of material in bulk, consisting of detached or independent blocks such as bricks, or other quantities of material in regular aliquot parts, with the lower course, tier, or layer, or perhaps several of the lower layers, shorter than the superimposed mass; and then in manipulating the mass by applying a lifting power horizontally at the ends of said shorter basic layer, or, secondly, by applying a lifting strain to the bulk at a point below the center of gravity but above the basic layer, and simultaneously applying a lateral clamping or second lifting strain below the plane of application of the first lifting strain, and horizontally at the ends of the shorter basic layer. The bricks or members of the shorter basic layer are set close together without any spaces or openings of any kind between them so that when clamped tightly at the ends they will be handled together as a consolidated unit.

Heretofore it has been customary in manipulating masses of material consisting of detached blocks such as bricks to prepare the same for the engagement therewith of a lifting mechanism by spacing apart the individual members of the bottom layer, this being done in order that the lifting devices might project their arms into the spaces between the bricks of the basic layer and be able to release themselves whenever the pile of brick was set down. In the case of a picking up of brick in stack formation to be carried into the kiln for burning, it was necessary to space apart the members of the basic layer the same as the other superimposed layers were spaced apart in order that the formation should be loose and open at the base as elsewhere and appropriate to undergo the burning operation. In the handling of burned brick, however, it is not necessary that the basic layer should be thus spaced apart, but a solid or unspaced layer can be used just as well; but, of course, in order to apply the lifting mechanism to said basic layer and readily disengage it therefrom when the pile is set down, it is essential that the basic layer be shorter than the superimposed mass, or, in other words, that the latter should project over the basic layer at each end to provide room to permit the manipulation of the lifting arms or the grappling devices, without having any projecting parts which prevent close piling of the stack against other stacks when it is set down.

All the beneficial results obtainable by spacing apart the members of the bottom course of brick when a pile is prepared for burning can be accomplished with burned brick with equal effectiveness by simply shortening the basic member, and setting it solid, leaving at the ends only enough space to allow the lifting arms to come out flush with the outside edge of the pile. In this way the mass is lifted by a compression strain on the lower course, or, if desired, upon a plurality of lower courses, and this method of procedure alows the mass of brick to be set up in the close or shipping formation where there are no interstices between the bricks, but they are placed in close contact with each other. But in thus claiming the advantage of the shortened layer without openings between its individual members for a stack built in close or shipping formation, I do not wish to be deprived of utilizing the same method in conjunction with a pile of brick whose constituent members are placed loosely in burning formation, and wish to set forth my invention broadly enough to cover its use with either the close or open stack formation. Of course, the short lower layer or layers that are to be clamped by the compression strain at the ends will always have the members thereof set close, and necessarily so, whether the formation above be loose or close. The lifting strain may be applied by means of clamps which grip the ends of the shorter layer without directly exerting any lifting strain upon the superincumbent mass, but merely clamp the bricks of the said lowermost tier with sufficient force to support the weight of the entire stack, the weight of the superincumbent mass being thus lifted by the initial compression strain on the lower tier; or the clamping mechanism may have lifting fingers underneath the projecting edges of the superincumbent mass, at the ends of the short basic layer, which fingers lift the mass as well as clamp the bricks of the lower tier for lifting the latter.

In the accompanying drawing illustrating one form of mechanism for carrying out my improved method, Figure 1 is a front perspective view of a stack formation of brick having a shorter basic layer, and showing a handling device operatively applied thereto. Fig. 2 is a rear perspective view of the same, showing particularly the short basic layer. Fig. 3 is an elevational view of said brick handling machine. Fig. 4 is a sectional top plan view of the same. Fig. 5 is a detail rear elevation of the lower portion of the mechanism. Fig. 6 is a vertical sectional side elevation. Fig. 7 is an enlarged detail view of the cam mechanism for exerting the primary clamping strain. Fig. 8 is a detail rear view of one of the clamping plates. Fig. 9 is an enlarged detail end view of the same with the actuating leverage therefor.

Similar characters of reference designate corresponding parts throughout the different figures of the drawing.

The main frame of the apparatus is vertically disposed in order that it may lie alongside of the mass of brick in proper position to permit the clamping mechanism at the base to be projected at the ends of the shorter basic layer for the purpose of clamping the latter and so that the upper portion of the frame may project over the mass and be suitably engaged by a lifting crane or other device. This main vertically disposed frame consists, in the present example of the invention, essentially of two inclined bars 1. 1 fastened together at their upper ends by means of a horizontal bolt 2. Between the inclined bars 1, 1 are two vertical bars 3, 3 whose upper ends are connected similarly by means of the bolt 2, and whose lower ends are secured by means of bolts 4 to a block 5, which block is integral with or firmly connected to a base bar 6, to which bar the lower ends of the inclined bars 1 are likewise bolted by means of bolts 7, there being two triangular base frames 8 which are suitably connected to the inclined bars 1 and the base bar 6, as fully shown in Fig. 2.

9 denotes a short lever at the top of the frame which it supported on the bolt 2. At the long end of this lever is an eye 10 pivoted thereto by means of a bolt 11, and at the other or short end of said lever 9 a cross head 12 is pivoted thereto by means of a bolt 13 passing through ears 14. To each end of the cross head 12 is pivoted a vertical bar 15 which extends downwardly to the lower end of the machine and has a thrusting action. Obviously, when some suspension means, such as a crane or other device, engages the eye 10 and lifts it and the long end of the lever 9, thereby turning lever 9 on its pivot 2, the cross head 12 and the thrust bars 15 will be forced downwardly, the result of which will be to act upon leverage devices at the lower end of the machine, as I shall presently more fully relate.

Referring to Fig. 2, and likewise to Figs. 3 and 5, the clamping plates 16, which are designed to act against the end bricks of the lower shorter tier of bricks, are clearly seen. These clamping plates have vertical faces, and are provided with suitable rear projections or ears $a$, arranged in pairs so that arms 17 may be pivoted between the members of the pairs. Hence, to these projections are pivoted crank arms 17 rigidly carried by the rock shafts 18, which latter are supported in suitable bearings in the lower part of the frame.

The thrust bars 15 are pivoted to levers 19 whose opposite ends are rigidly secured to the rock shafts 18, (see Fig. 4), so that when said thrust bars 15 are depressed the levers 19 are depressed likewise, and the rock shafts 18 rotated more or less, the effect of which is to actuate the crank arms 17 and force the clamping plates 16 toward each other, or, in other words, press them tightly against the ends of the lower tier of bricks. The rock shafts 18 are, furthermore, provided with upwardly extending arms 20 rigidly affixed thereto, to which are connected long links 21 in the length of each of which I find it convenient to interpose turn buckles 22 to be used in adjusting their length. The inner adjacent ends of the rods 21 are provided with overlapping rectangular yoke frames 23 having elliptical sockets 24 in which a cam 25 is supported which is susceptible of rotation by the application of a wrench to the square head 26 of a bolt 27 or other device that passes through the center of the cam 25. As the cam 25 is turned in one direction or the other, the yokes 23 act to draw the links 21 relatively to each other, pulling them toward each other, and thus to correspondingly move the crank arms 20 and turn the rock shafts 18 to a greater or less extent. The object of using this cam device is thus to enable the clamping plates to be set by hand close against the bricks at the ends of the lower tier before the second lifting strain is applied by the action of bars 15 and levers 19. There is thus a primary clamping and a secondary clamping. The first is by hand and the second is automatic through the lifting of the machine. The first gives a tight and effective grip which is held by the second, and the latter augments while the mass is being lifted.

In Fig. 7, I have shown in enlarged detail one of the clamping plates 16 and the mechanism for actuating it. The crank arms 17 carried by the rock shafts 18 are loosely connected to the ears *a* by having slots *b* in said crank arms 17 near the ends thereof, into which slots project rigid pins *c* on the ears *a*. The ends of these arms 17 are in contact with flat springs 28 that lie between the members of each pair of ears *a* (see Fig. 7). The interposition of this spring between the end of each crank arm 17 and the rear face of the clamping plate 16 enables the crank of the clamping plate 16 enables the crank 17 to press with a yielding action against the clamping plate during the time that the crank 17 is traveling through the length of its slot *b* or until the pin *c* finds a solid seat in the end of the slot *b* nearest to the rock shaft 18. In other words, supposing the parts to be in the position shown in Fig. 9, and the crank arm 17 to be forcing the clamping plate 16 in the direction shown by the arrow, it will be evident that if the spring 28 is sufficiently strong the clamping plate 16 will be moved against the brick by the action of the arm 17 thereon before a compression of the spring 28 takes place, and after the plate 16 is so seated against the brick, the arm 17 will continue its movement in the direction shown by the arrow in Fig. 7, and this arm will travel through the length of the slot *b* and will yieldingly press the clamping plate against the brick, thereby enabling inequalities and irregularities in the brick to be compensated for. The faces of the clamping plates 16 that come into contact with the bricks are provided with rubber, leather or other elastic pieces that cover the entire faces or only parts of them, as at *d d*, Fig. 5, to assist in making a tight grip and to overcome defects in the surface of the brick, compensating for inequalities, etc. In order that the clamps 16 may not be deflected from a vertical position, I interpose behind them links 29 that form with the crank arms 17 a sort of parallel motion.

In the operation of the machine, for carrying out my invention, it will be understood that after it has been placed alongside of the pile of brick with the two clamping plates 16 in proper position at the ends of the basic tier, the wrench or key for manipulating the cam 25 will be applied to the stem thereof and the yokes drawn together, the result of which will be to bring the clamping plates 16 into strong biting contact with the adjacent faces of the ends of the tier. This is done by hand before the lifting power is applied to the machine. When the lifting movement begins the raising of the long end of the lever 9 at the top of the machine will correspondingly depress the thrust bars 15 which are pivoted to the ends of the long crank arms 19 at the base of the machine, and hence it results that the movement of these long arms 19 will rock the shafts 18 and actuate the crank arms 17 in the manner I have already explained. Thus a very tight and steady grip is applied with enormous force at the ends of the lower tier, causing all the bricks of said tier to hold rigidly together as if in a single unit, and the lifting strain thus applied to the lower tier is amply sufficient to lift the superincumbent mass. The initial lifting movement applied to the top of the apparatus automatically clamps the lower tier so that the lifting strain whereby the superposed mass is raised is exerted through the clamping strain on the basic layer. This is the case when the clamps 16 do not function as lifting arms, but wholly as clamping devices. There may be cases where it would be advisable to allow the clamps 16 to perform the function of lifting arms as well as clamping members, in which case they will rest underneath the overhanging ends of the superposed mass, fitting neatly into the recesses beneath said overhanging ends alongside of the ends of the basic layer; but I do not wish to be restricted to employing a lifting strain which is applied vertically beneath the mass by contact therewith of lifting arms, but wish to claim broadly the method of lifting a mass by a grip applied to the ends of a basic layer composed of members without interstices between them. When a mass of brick is thus lifted it can be set down with its sides in close contact with the sides of other unit stacks, without imprisoning the clamping plates, which can be readily withdrawn. Hence there is no lost space.

The description of the method which I have herein set forth is not intended to be such as to confine me rigidly to everything the way I have described it, but I reserve the liberty of varying the method in non-essential details provided only the same desired effect may be attained. It will be clearly evident that in the operation of the method, or of any particular mechanism which carries it into effect, both of the clamping members need not be movable, but one can be stationary and the other movable; and I wish it distinctly understood that my invention is broad enough to cover a clamp having a single movable member.

The method herein described is disclosed and described but not claimed in my co-pending application for Letters Patent for apparatus for handling bricks in bulk, filed October 8, 1908, Serial No. 456,692; of which application the present one is a division. In this application the method is claimed while in the other application the claims are confined to the details of the mechanical apparatus.

Having thus described my invention, what I claim as new and desire to secure by Letters Patent, is:

1. A method of handling brick and similar detached pieces of material, which consists in stacking the same with a basic layer shorter than the mass above it, and with the units of the basic layer in direct contact with one another, applying a clamping force at the opposite ends of said basic layer, said clamping force being applied in two parts, first by manually-operated means and second by automatic means, the said secondary clamping force being simultaneous with the lifting of the whole mass and being derived from the lifting power.

2. The method of handling brick and similar detached pieces of material, which consists in piling the same with a bottom tier shorter than the superincumbent mass and with its units in direct contact with one another, applying an initial clamping force at the opposite ends of said basic layer, and then applying a secondary lifting force to the ends of said layer, said force applied to the basic layer having an elastic character to prevent any slipping of the bricks.

3. The method of handling brick and similar detached pieces of material, which consists in piling the same with a bottom tier shorter than the rest of the mass and with its units in direct contact with one another, applying an initial clamping force at the opposite ends of said basic layer, and then applying a secondary force to said layer, said second force being derived automatically from the power lifting the whole mass.

In testimony whereof I affix my signature in presence of two witnesses.

RAYMOND C. PENFIELD.

Witnesses:
   CHAS. E. DUNCAN,
   C. P. MERTENS.